United States Patent [19]

Alexander

[11] Patent Number: 5,778,932

[45] Date of Patent: Jul. 14, 1998

[54] ELECTROHYDRAULIC PROPORTIONAL PRESSURE REDUCING-RELIEVING VALVE

[75] Inventor: Dan Alexander, Schaumburg, Ill.

[73] Assignee: Vickers, Incorporated, Maumee, Ohio

[21] Appl. No.: 868,647

[22] Filed: Jun. 4, 1997

[51] Int. Cl.[6] ............................................. F15B 13/044
[52] U.S. Cl. ................................. 137/625.65; 137/625.68
[58] Field of Search ........................... 137/625.65, 625.68

[56] References Cited

U.S. PATENT DOCUMENTS

| | | | |
|---|---|---|---|
| 3,880,476 | 4/1975 | Belart et al. | 137/625.65 X |
| 4,316,599 | 2/1982 | Bouvet et al. | 251/50 X |
| 4,548,383 | 10/1985 | Wolfges | 137/625.68 X |
| 5,002,253 | 3/1991 | Kolchinsky et al. | |
| 5,014,747 | 5/1991 | Suzuki et al. | 137/625.65 |
| 5,174,338 | 12/1992 | Yokota et al. | 137/625.65 X |

OTHER PUBLICATIONS

Vickers catalog, "EPRV1–10" entry, pp. 18, 19 (Undated).
Sterling Hydraulics catalog, "GTP02" entry (2 pages) (Undated).
Parker catalog (Waterman Hydraulics), "Series 12" (2 pages) (Undated).

*Primary Examiner*—Gerald A. Michalsky
*Attorney, Agent, or Firm*—Jones, Day, Reavis & Pogue

[57] ABSTRACT

A hydraulic valve is disclosed including a valve body, a pressure inlet port, a return port, and a regulated pressure port. A cavity is formed in the valve body, in fluid communication with the various ports. The cavity comprises a first chamber having a desired first diameter and a second chamber, having a desired second diameter greater than that of said first chamber. A solenoid-actuated spool is movably retained within said cavity for selectively connecting the regulated pressure port to the inlet port and return port in response to an actuation force. The spool comprises a first section, retained within the first chamber, and a second section, retained within the second chamber, and having a respective corresponding predetermined diameters. A fluid passage establishes fluid communication between the first chamber and the second chamber. Upon actuation of the spool, the chambers become pressurized by the inlet port, and the hydraulic fluid in the second chamber acts on the differential sectional area between the first and second sections to produce a feedback force that opposes the actuation force acting on the spool. This creates a desired spool modulation between the inlet port and the return port, so as to establish a desired regulated pressure at the regulated pressure port.

3 Claims, 1 Drawing Sheet

ELECTROHYDRAULIC PROPORTIONAL PRESSURE REDUCING-RELIEVING VALVE

BACKGROUND OF THE INVENTION

The present invention pertains to the field of hydraulic valves, particularly those of the type for providing a precise regulated pressure, as used in transmission and brake clutch applications, and for piloting larger valves. Solenoid-actuated proportional pressure regulating valves are used for producing a desired regulated pressure in proportion to the current through the solenoid. Pressure is controlled by controlling the position of a spool as the result of a balance between the solenoid force and a feedback force produced by a pressure differential within the valve.

One such type of valve is manufactured by Sterling Hydraulics, Inc. as Model Nos. GTP02-34A, B and C. In this valve type, fluid is admitted at two orifices, and the pressure differential between the orifices creates a feedback force that opposes the actuating force of the solenoid. The feedback force is directly related to the solenoid current, and the balance of forces is intended to maintain the spool at a precise position to modulate the opening of the inlet and return ports in order to maintain regulated pressure at the regulated pressure port.

In the previous valve, the orifice sizes must be precisely maintained in order to control the pressure differentials. However, the orifices are very small and can easily become plugged by contaminants, which throw off the pressure balance of the valve, degrading control precision. Since the pressure differential is controlled strictly by flow through the orifices, the performance of the previous valve is sensitive to variations in the viscosity of the hydraulic fluid, which varies with temperature and can be different between various types of fluid. Such viscosity sensitivity also reduces the reliability of the previous valve. Such valves also suffer from parasitic losses in which the fluid used for developing feedback pressure leaks to the return port, thereby reducing efficiency.

BRIEF DESCRIPTION OF THE INVENTION

In view of the drawbacks and deficiencies encountered in previous proportional valves, there is therefore a need for a valve that is not sensitive to contamination.

There is also a need for a valve that is not sensitive to viscosity variations.

There is also a need for a valve with greater reliability and simplicity of construction.

These needs and others are satisfied by the present invention. A hydraulic valve is disclosed including a valve body. A pressure inlet port is provided for receiving pressurized hydraulic fluid into the valve. A return port is provided for establishing tank pressure in the valve, and a regulated pressure port for receiving discharged hydraulic fluid having a predetermined pressure. A cavity is formed in the valve body, in fluid communication with the inlet port, the return port and the regulated pressure port. The cavity comprises a first chamber having a predetermined first diameter and a second chamber, having a predetermined second diameter greater than that of said first chamber.

A solenoid-actuated spool is provided, movably retained within said cavity, for selectively connecting the regulated pressure port to the inlet port and return port in response to an actuation force. The spool comprises a first section, retained within the first chamber, and having a corresponding predetermined first diameter, and a second section, retained within the second chamber, and having a corresponding predetermined second diameter greater than that of the first section.

A fluid passage is provided for establishing fluid communication between the first chamber and the second chamber. Upon actuation of the spool, the first and second chambers become pressurized by the inlet port, and the hydraulic fluid in the second chamber acts on the greater sectional area of said second section to produce a feedback force that opposes the actuation force acting on the spool. This creates a desired spool modulation between the inlet port and the return port, so as to establish a desired regulated pressure at the regulated pressure port.

The above and other needs which are satisfied by the present invention will become apparent from consideration of the following detailed description of the invention as is particularly illustrated in the accompanying drawings.

DETAILED DESCRIPTION OF THE INVENTION

Figure 1:
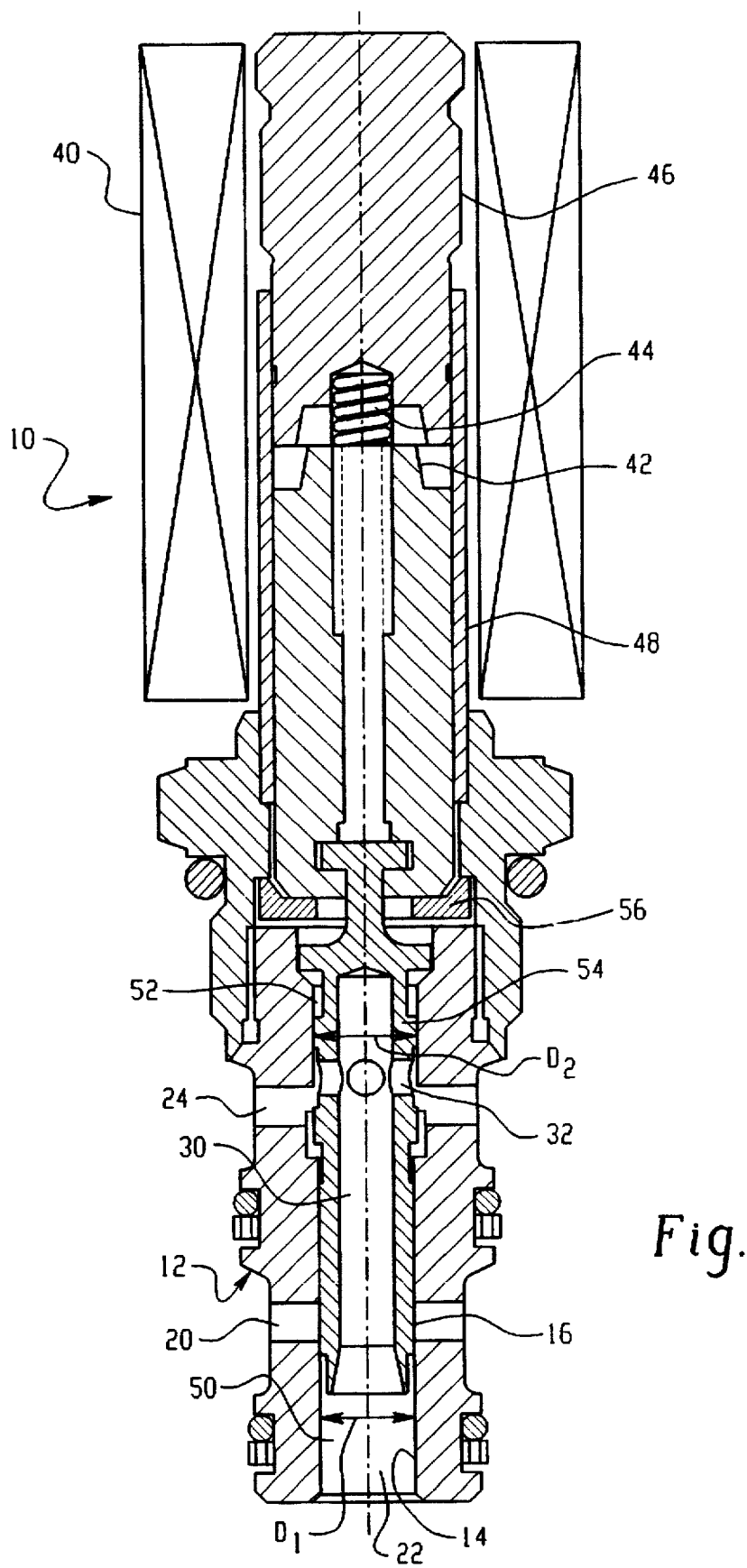
FIG. 1 is a side sectional view of the proportional valve of the present invention.

FIG. 1 illustrates an electrohydraulic proportional pressure reducing-relieving valve 10 in accordance with the present invention. In the preferred embodiment, the valve 10 includes a valve body 12 including a cavity 14, cylindrical and concentric with the valve body 12. A spool 16 is provided, having a size and shape suitable for movable retention within the cavity 14.

The valve body 12 includes a pressure inlet port 20 for receiving hydraulic fluid into the valve. A regulated pressure port 22 is provided for receiving discharged hydraulic fluid at a desired regulated pressure. An unpressurized return port 24 is provided for connecting the valve to tank pressure. In the preferred embodiment, the spool 16 includes a fluid passage 30, preferably a concentric bore open to the regulated pressure port 22. The fluid passage 30 includes an opening 32, preferably one or more transverse bores, positioned along the spool 16 to be open to the return port 24, so as to permit fluid communication between the return port 24 and the regulated pressure port 22 when the spool 16 is in a non-actuated rest position.

The present valve is preferably a "pull-type" proportional solenoid valve. Upon actuation of a solenoid 40, a magnetic core 42, connected to the spool 16, is pulled longitudinally upward, toward a pole piece 46, retained inside a fluidtight tube 48. A biasing spring 44 is provided which acts against the stationary pole piece 46 to bias the core 42 to its rest position when the solenoid 40 is de-energized. This configuration also provides a constant proportional solenoid force throughout the core stroke, thus being a proportional valve. The core 42 includes a bore for filling and draining fluid as the volume changes between the core 42 and the pole piece 46.

During actuation, the spool 16 is displaced so that the openings 32 are blocked, thereby closing the return portion 24. The inlet port 20 is unblocked, admitting pressurized fluid to the regulated pressure port 22. A first chamber 50 having diameter D1 is defined at the end of the cavity by the spool 16 near the regulated pressure port 22. The first chamber 50 is fluidly connected through the fluid passage 30 to a second chamber 52, at the opposite end of the cavity 14. The second chamber 52 has a somewhat larger diameter D2 and thus a sectional area greater than that of the cavity 14 and the first chamber 50. The spool 16 includes an extended portion 54 having a corresponding diameter and sectional area greater than the cavity 14 and the first chamber 50.

Upon actuation, first and second chambers 50, 52 become equally pressurized by the inlet port 20. The pressure of the hydraulic fluid in the second chamber 52 acts on the greater sectional area of the extended portion 54, which produces a force on the spool greater than the force exerted by the pressure at the first chamber end. The differential areas results in a force imbalance producing a net feedback force, operating to oppose the actuation force of the solenoid acting on the spool 16. The feedback force acts to displace spool 16 toward the closed position, thereby closing the inlet port 20 and opening the return port 24, thus establishing the minimum tank pressure in the valve 10. A dithering or modulation of the spool 16 occurs as the inlet port 20 again pressurizes the valve 10, which again vents to the return port 24. The net pressure at the regulated pressure port 22 represents an equilibrium pressure state resulting from the balance between the solenoid force and the feedback force.

The feedback force is controlled in direct proportion to the solenoid actuation force, which is itself a function of the current through the solenoid 40. A large current produces a large solenoid actuation force, which requires a large feedback force to oppose it. Therefore a large solenoid force develops a large regulated pressure at the regulated pressure port 22. Displacement of the spool 16 is limited by a stop 56 that limits the motion of the core 42 (when de-energized) and the spool 16 (when energized). The position of the spool 16 and thus the effective size of the inlet 20 can be controlled to a very precise degree with the present invention, and thereby, the pressure at the regulated pressure port 20 can be closely controlled. The regulated pressure of the present valve can be varied by a measured application of electrical current, and so the present invention can be controlled without my mechanical adjustments. The valve of the present invention can be used to vary an inlet pressure of 500 psi to a regulated pressure from between 0-321 psi with a precision of within 5% of a desired pressure.

The present valve 10 also has a relieving function. In the event that pressure at the regulated pressure port 22 should go above the pressure level set by the solenoid force (due to actuator loads or other circuit induced causes) the spool 16 will close the inlet port 20 and relieve the regulated pressure to the return port 24 to restore the balance.

The foregoing description of the preferred embodiment has been presented for purposes of illustration and description. It is not intended to be limiting insofar as to exclude other modifications and variations such as would occur to those skilled int he art. Any modifications such as would occur to those skilled in the art in view of the above teachings are contemplated as being within the scope of the invention as defined by the appended claims.

I claim:

1. A hydraulic valve, including a valve body, comprising:

a pressure inlet port for receiving pressurized hydraulic fluid into the valve;

a return port for establishing tank pressure in the valve;

a regulated pressure port for receiving discharged hydraulic fluid having a predetermined pressure;

a cavity formed in the valve body, in fluid communication with the inlet port, the return port and the regulated pressure port wherein said cavity comprises:

a first chamber having a predetermined first diameter;

a second chamber, having a predetermined second diameter greater than that of said first chamber;

wherein the valve further comprises:

a solenoid-actuated spool, movably retained within said cavity, for selectively connecting the regulated pressure port to the inlet port and return port in response to an actuation force, wherein the spool comprises:

a first section, retained within the first chamber, and having a corresponding predetermined first diameter and a first sectional area;

a second section, retained within the second chamber, and having a corresponding predetermined second diameter and second sectional area are greater than that of the first section so as to produce a differential sectional area between the first and second sections;

a fluid passage for establishing fluid communication between the first chamber and the second chamber, wherein the fluid passage includes a transverse opening for communicating with the return port, and wherein, upon actuation of the spool, the first and second chambers become pressurized by the inlet port, and the hydraulic fluid in the second chamber acts on the differential area between the first and second sections to produce a feedback force that opposes the actuation force acting on the spool, in order to create a desired spool modulation between the inlet port and the return port, so as to establish a desired regulated pressure at the regulated pressure port.

2. The hydraulic valve of claim 1 wherein the fluid passage for fluidly connecting the first and second chambers is formed along a center axis of the spool.

3. The hydraulic valve of claim 1 wherein the valve is a "pull-type" proportional solenoid valve.

* * * * *